US012566272B2

(12) United States Patent
Wu et al.

(10) Patent No.:   US 12,566,272 B2
(45) Date of Patent:      Mar. 3, 2026

(54) 3D SCANNING SYSTEM AND METHOD

(71) Applicant: Himax Technologies Limited, Tainan City (TW)

(72) Inventors: Min-Chian Wu, Tainan City (TW);
Ting-Sheng Hsu, Tainan City (TW);
Ching-Wen Wang, Tainan City (TW);
Cheng-Che Tsai, Tainan City (TW)

(73) Assignee: Himax Technologies Limited, Tainan City (TW)

( * ) Notice: Subject to any disclaimer, the term of this patent is extended or adjusted under 35 U.S.C. 154(b) by 762 days.

(21) Appl. No.: 17/992,892

(22) Filed: Nov. 22, 2022

(65) Prior Publication Data

US 2024/0168168 A1      May 23, 2024

(51) Int. Cl.
G01S 17/894        (2020.01)
G01S 7/481          (2006.01)
G06T 7/521          (2017.01)

(52) U.S. Cl.
CPC .......... G01S 17/894 (2020.01); G01S 7/4816 (2013.01); G01S 7/4817 (2013.01); G06T 7/521 (2017.01); *G06T 2207/10028* (2013.01)

(58) Field of Classification Search
CPC ...... G01S 17/89; G01S 17/894; G01S 7/4816; G01S 7/4817; G06T 2207/10028; G06T 7/521
See application file for complete search history.

(56) References Cited

U.S. PATENT DOCUMENTS

2018/0180400 A1*   6/2018   Homma ............. G01B 9/02044
2023/0213610 A1*   7/2023   Eberspach ........... G06V 40/166

FOREIGN PATENT DOCUMENTS

CN          109186493 A      1/2019

OTHER PUBLICATIONS

Office Action Dated May 27, 2024 in corresponding Taiwan Patent Application No. 112132550.

* cited by examiner

*Primary Examiner* — Hina F Ayub
(74) *Attorney, Agent, or Firm* — Donald E. Stout; Stout, Uxa & Buyan, LLP

(57)          ABSTRACT

A three-dimensional (3D) scanning system includes a projector that generates an emitted light projected on an object, a reflected light being reflected from the object; a sensor that generates image data according to the reflected light; and a depth processor that generates depth data according to the image data and at least one modified factor representing corresponding deviation amount between the image data and an ideal image data due to a circle of confusion caused by the reflected light passing a lens of the sensor and then irradiating a sense plane of the sensor out of focus.

20 Claims, 8 Drawing Sheets

<u>100</u>

100

200

21 — Generate image data

22 — Generate depth data according to image data and modified factor

23 — Depth data interfered ?

No → 24 — Output depth data

Yes

25 — Determine position of CoC

26 — Determine range of CoC

27 — Determine modified factor

400

21 — Generate image data

22C — Generate depth data according to image data and modified factor of preceding frame

24

Output depth data

25 — Determine position of CoC

26 — Determine range of CoC

27 — Determine modified factor succeeding frame

3D SCANNING SYSTEM AND METHOD

BACKGROUND OF THE INVENTION

1. Field of the Invention

The present invention generally relates to a three-dimensional (3D) scanning system and method, and more particularly to a 3D scanning system and method without interference.

2. Description of Related Art

A three-dimensional (3D) scanning device is instrumentation for measuring the 3D shape of an object or scene by analyzing a real-world object or scene to collect data on its shape, thereby obtaining a depth map that is an image containing information relating to the distance of the surfaces of the object or scene from a viewpoint. Collected 3D data is useful for a wide variety of applications, such as face recognition, virtual reality, augmented reality, and robotic mapping.

A time-of-flight (ToF) scanner is one 3D scanning device that employs time-of-flight techniques to resolve distance between a sensor (e.g., camera) and an object for each point of the image by measuring the round trip time of an artificial light signal provided by a light source.

A structured-light scanner is another 3D scanning device that projects light patterns provided by a light source onto an object and then captures distorted reflected light patterns by a sensor, according to which the surface shape can be reconstructed.

Due to optical imperfectness of the sensor used in the 3D scanning devices, light rays passing through a lens or lenses cannot converge on a focus. The non-ideal focusing caused by a near object may usually interfere with scanning devices' ability to determine the depth of a far object.

For the reason that conventional 3D scanning devices could not effectively resolve distance between a sensor and an object, a need has arisen to propose a novel scheme to overcome the drawbacks of the conventional 3D scanning devices.

SUMMARY OF THE INVENTION

In view of the foregoing, it is an object of the embodiment of the present invention to provide a three-dimensional (3D) scanning system and method capable of properly obtaining depth data without being interfered with a circle of confusion (CoC).

According to one embodiment, a three-dimensional (3D) scanning system includes a projector, a sensor and a depth processor. The projector generates an emitted light projected on an object, a reflected light being reflected from the object. The sensor generates image data according to the reflected light. The depth processor generates depth data according to the image data and at least one modified factor representing corresponding deviation amount between the image data and an ideal image data due to a circle of confusion caused by the reflected light passing a lens of the sensor and then irradiating a sense plane of the sensor out of focus.

DETAILED DESCRIPTION OF THE INVENTION

Figure 1:
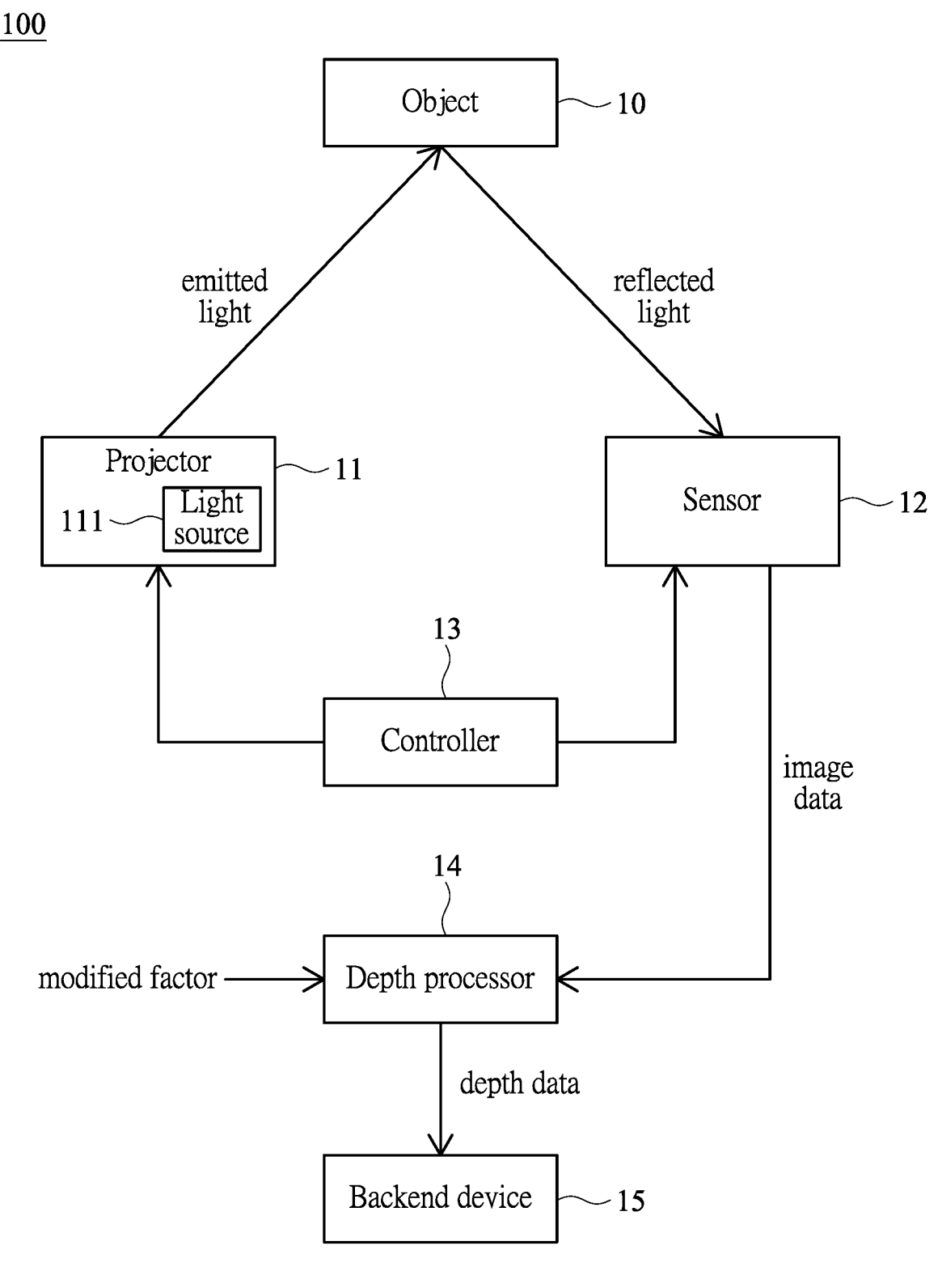
FIG. 1 shows a block diagram illustrating a three-dimensional (3D) scanning system according to one embodiment of the present invention.

FIG. 1 shows a block diagram illustrating a three-dimensional (3D) scanning system 100 according to one embodiment of the present invention. Although time-of-flight (ToF) techniques are illustrated in the following embodiments, it is appreciated that other 3D scanning techniques such as structured-light scanning techniques may be adopted instead.

In the embodiment, the 3D scanning system 100 may include a projector 11 configured to generate an emitted light projected on an object 10, and a reflected light is reflected from the object 10. Specifically, the projector 11 may include a light source 111, which may be one type of light sources such as point light source, scatter light source or plane (or flood) light source. In one embodiment, the light source 111 may be a light-emitting diode (LED). In another embodiment, the light source 111 may be a laser diode (LD), such as an edge-emitting laser (EEL) with laser beam emission from surfaces formed by cleaving an individual chip out of a wafer, or a vertical-cavity surface-emitting laser (VCSEL) with laser beam emission perpendicular from a top surface.

The 3D scanning system 100 of the embodiment may include a sensor 12, such as a camera, configured to generate image data according to the reflected light. In the embodiment, the 3D scanning system 100 may include a controller 13, such as a microcontroller, configured to control timing of the projector 11 and the sensor 12. Specifically, the controller 13 may control time at which the projector 11 generates the emitted light, and may control an amount of the reflected light (i.e., exposure) received by the sensor 12.

In the embodiment, the 3D scanning system 100 may include a depth processor (or depth decoder) 14, such as an image processor, configured to generate depth data (e.g., depth map) according to the image data collected by the sensor 12. It is appreciated that, in one embodiment, the controller 13 and the depth processor 14 may be implemented in a single integrated circuit. The depth data generated by the depth processor 14 may be further fed to a backend device 15, such as a general-purpose computers (e.g., personal computers or mobile devices) to realize a wide variety of 3D applications, such as face recognition, virtual reality, augmented reality, and robotic mapping.

Figure 2:
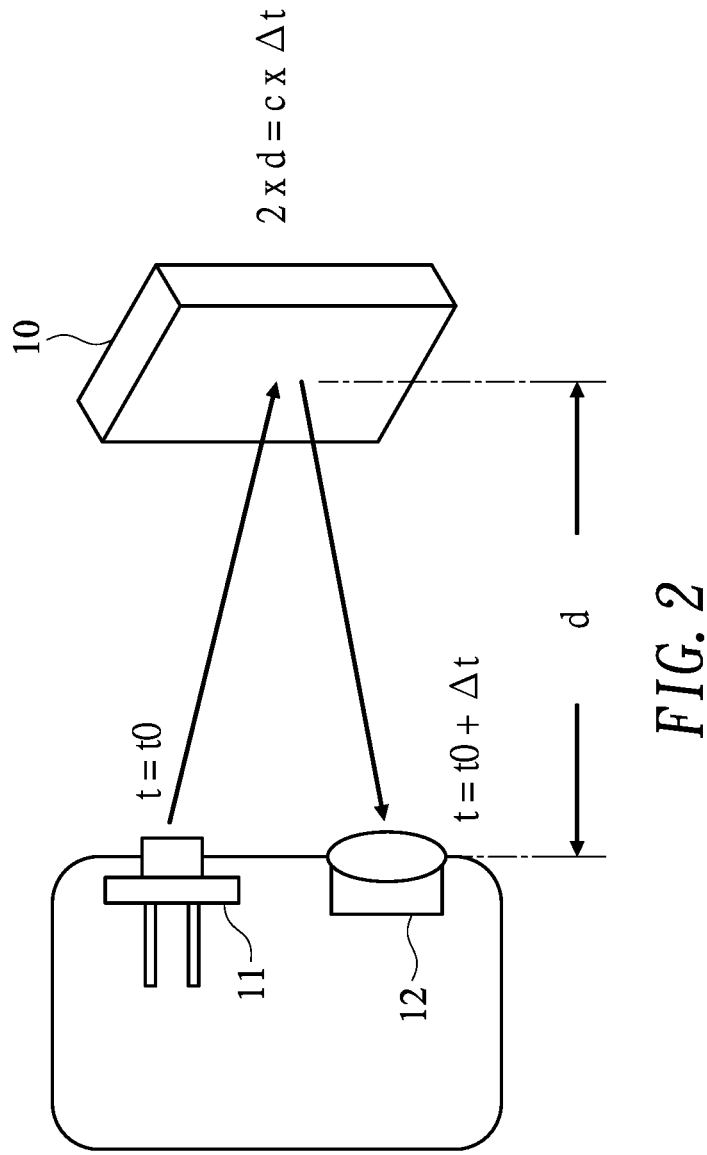
FIG. 2 schematically illustrates a time-of-flight (ToF) technique adopted by the depth processor of FIG. 1 to determine a distance between the sensor and the object.

FIG. 2 schematically illustrates a time-of-flight (ToF) technique adopted by the depth processor 14 of FIG. 1 to determine a distance d between the sensor 12 and the object 10. Specifically, an emitted light is projected by the projector 11 at time t0, and a reflected light is received by the sensor 12 at time t0+Δt, where Δt represents round trip time of light emission. As the emitted light and the reflected light travel at the speed of light (c), the distance d between the sensor 12 and the object 10 is therefore determined to be (c*Δt/2).

Figure 3A:
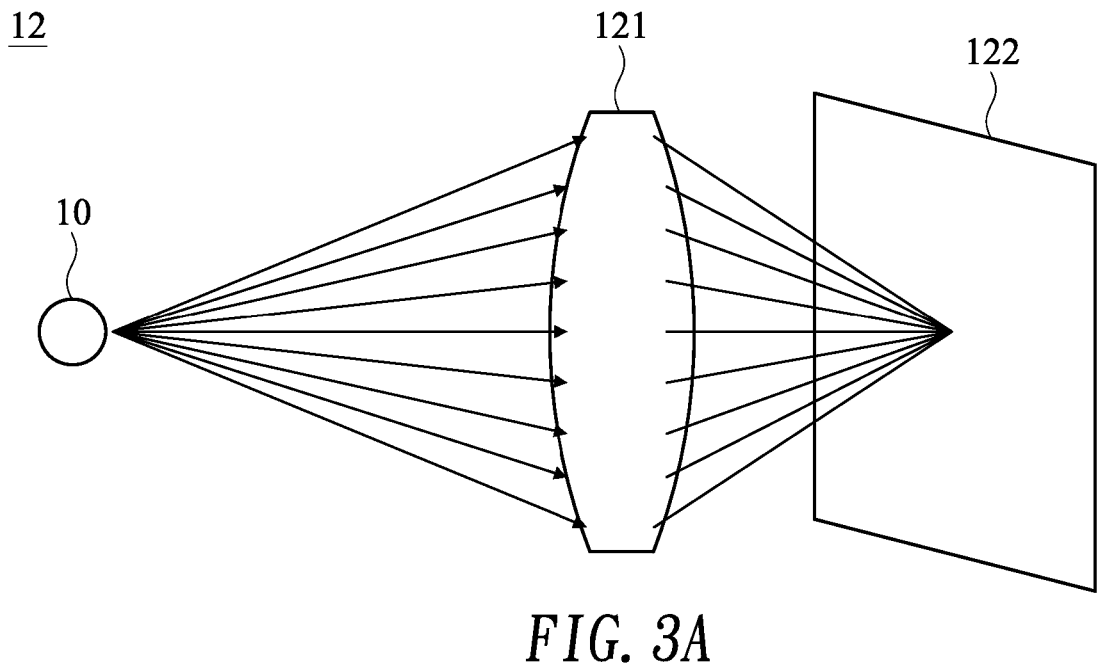
FIG. 3A schematically shows the reflected light passing a lens of the sensor and then converging in focus on a sense plane of the sensor in an ideal scenario.
Figure 3B:
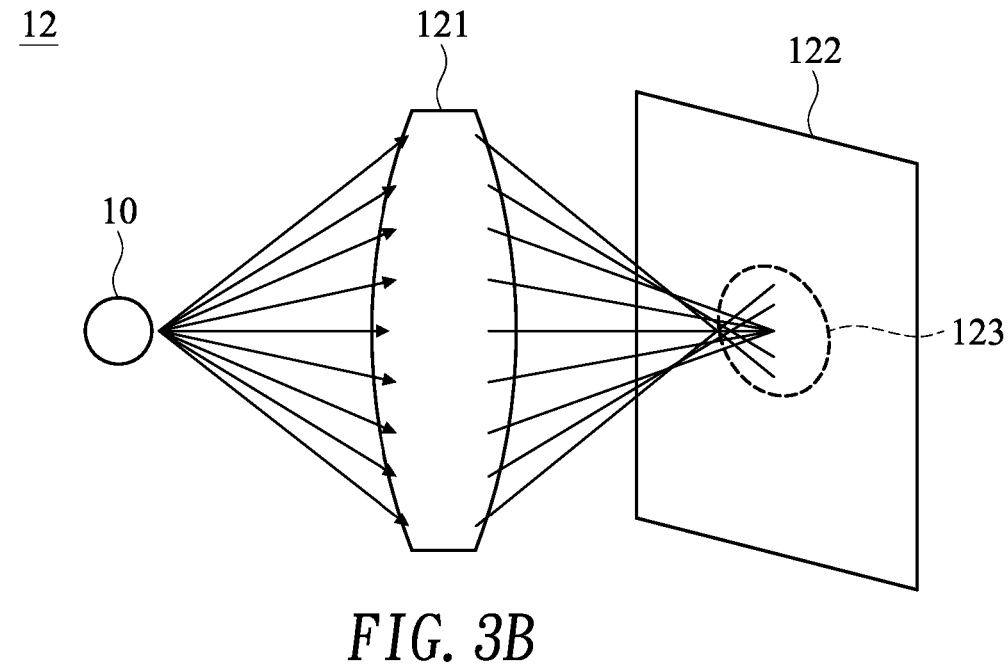
FIG. 3B schematically shows the reflected light passing a lens of the sensor and then irradiating a sense plane of the sensor out of focus in a real scenario.

FIG. 3A schematically shows the reflected light passing a lens 121 of the sensor 12 and then converging in focus on a sense plane 122 of the sensor 12 in an ideal scenario. FIG. 3B schematically shows the reflected light passing a lens 121 of the sensor 12 and then irradiating a sense plane 122 of the sensor 12 out of focus in a real scenario, in which a circle of confusion (CoC) 123 is caused by a cone of light rays from the lens 121 not coming to a perfect focus. The circle of confusion 123 commonly becomes more noticeable (i.e., larger) when the object 10 possesses higher reflectivity or is nearer the sensor 12.

Figure 3C:
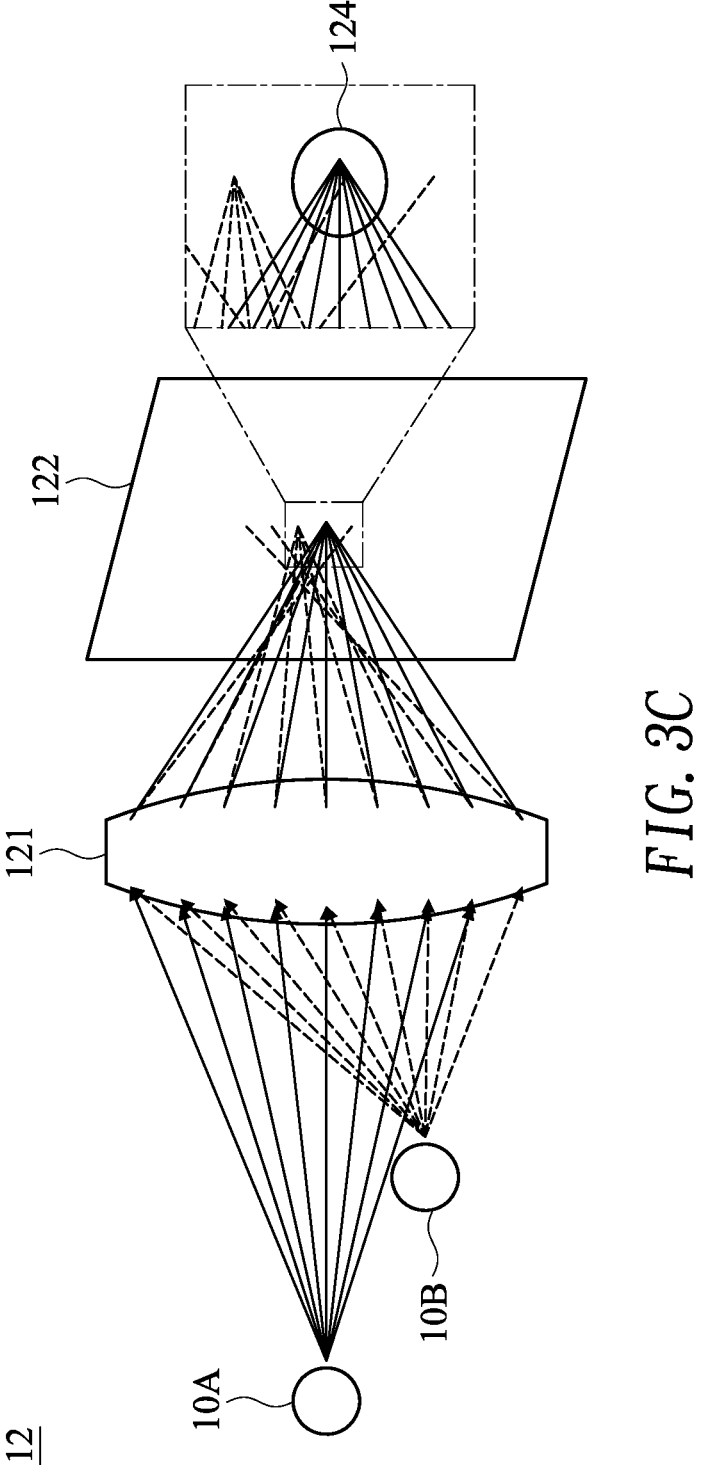
FIG. 3C schematically shows the reflected light from a far object and the reflected light from a near object passing a lens of the sensor and then irradiating a sense plane of the sensor.

FIG. 3C schematically shows the reflected light from a far object 10A and the reflected light from a near object 10B passing a lens 121 of the sensor 12 and then irradiating a sense plane 122 of the sensor 12. In this (real) scenario, the circle of confusion (CoC) caused by the near object 10B may interfere with capability of the depth processor 14 to properly obtain the depth data of the far object 10A within the denoted circle 124.

Figure 4:
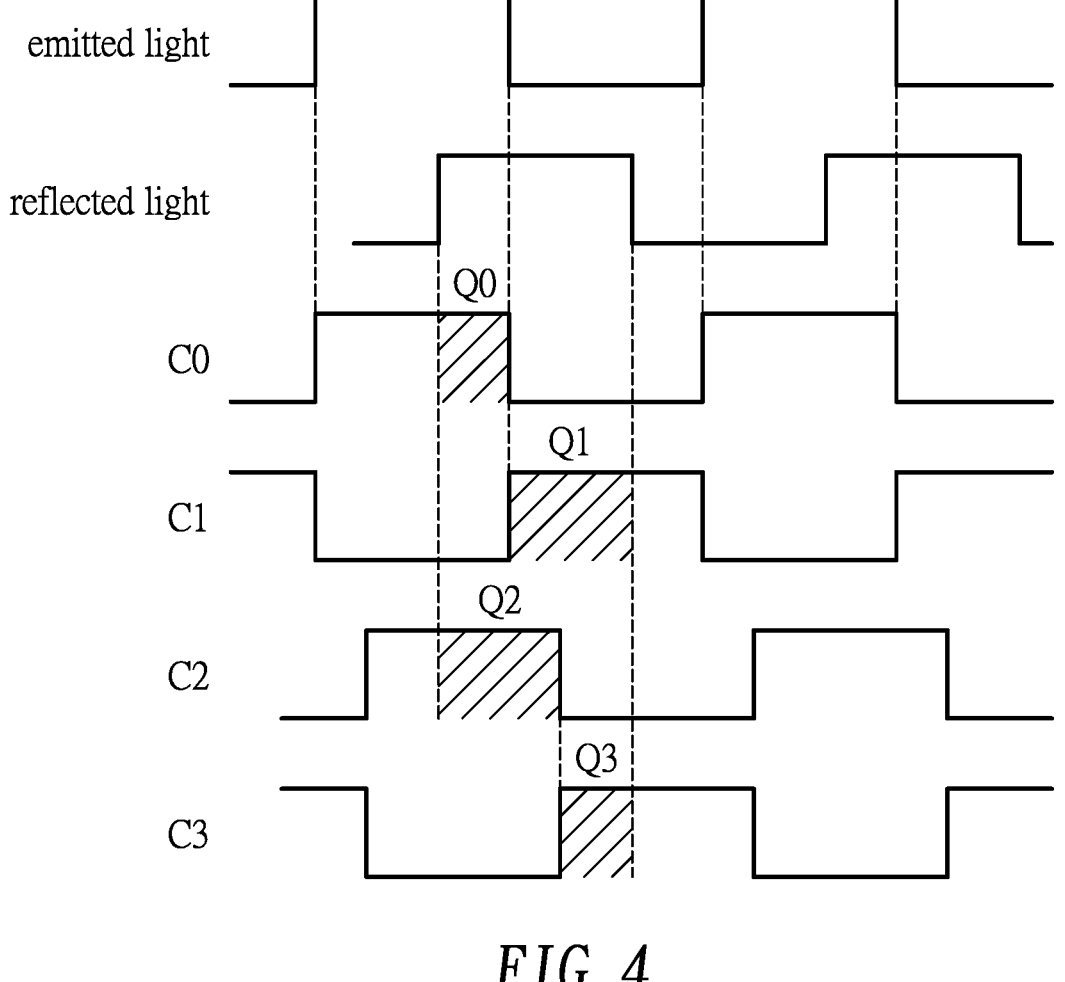
FIG. 4 shows an exemplary embodiment of generating image data by the sensor.

FIG. 4 shows an exemplary embodiment of generating image data by the sensor 12, details of which may be referred to "Introduction to 3D ToF Three-Dimensional Scene Depth Measurement System," by Garrick Dai of Texas Instruments, which is incorporated herein by reference.

Specifically, in an ideal scenario, image data are generated with a plurality of (e.g., four) measure windows C0-C3, during which (ideal) accumulated (electric) charges Q0-Q3 are collected respectively as shown in FIG. 4. The depth data may be generated (by the depth processor 14) according to the accumulated charges Q0-Q3 as follows:

$$\text{Depth} \propto \arctan\left(\frac{Q1 - Q3}{Q0 - Q2}\right)$$

where symbol ∝ represents proportionality.

In a real scenario, however, due to interference caused by the circle of confusion (CoC), real accumulated charges Q0'-Q3' are collected. The real accumulated charges Q0'-Q3' may be expressed as follows:

$$Q0'=Q0+Q0\_CoC$$

$$Q1'=Q1+Q1\_CoC$$

$$Q2'=Q2+Q2\_CoC$$

$$Q3'=Q3+Q3\_CoC$$

where Q0_CoC to Q3_CoC are modified factors respectively representing corresponding deviation amounts between the real accumulated charges and the ideal accumulated charges. The depth data without interference (after compensation) may be expressed as follows:

$$\text{Depth} \propto \arctan\left(\frac{Q1 - Q3}{Q0 - Q2}\right) = \arctan\left(\frac{(Q1' - Q3') - (Q1\_CoC - Q3\_CoC)}{(Q0' - Q2') - (Q0\_CoC - Q2\_CoC)}\right)$$

Figure 5:
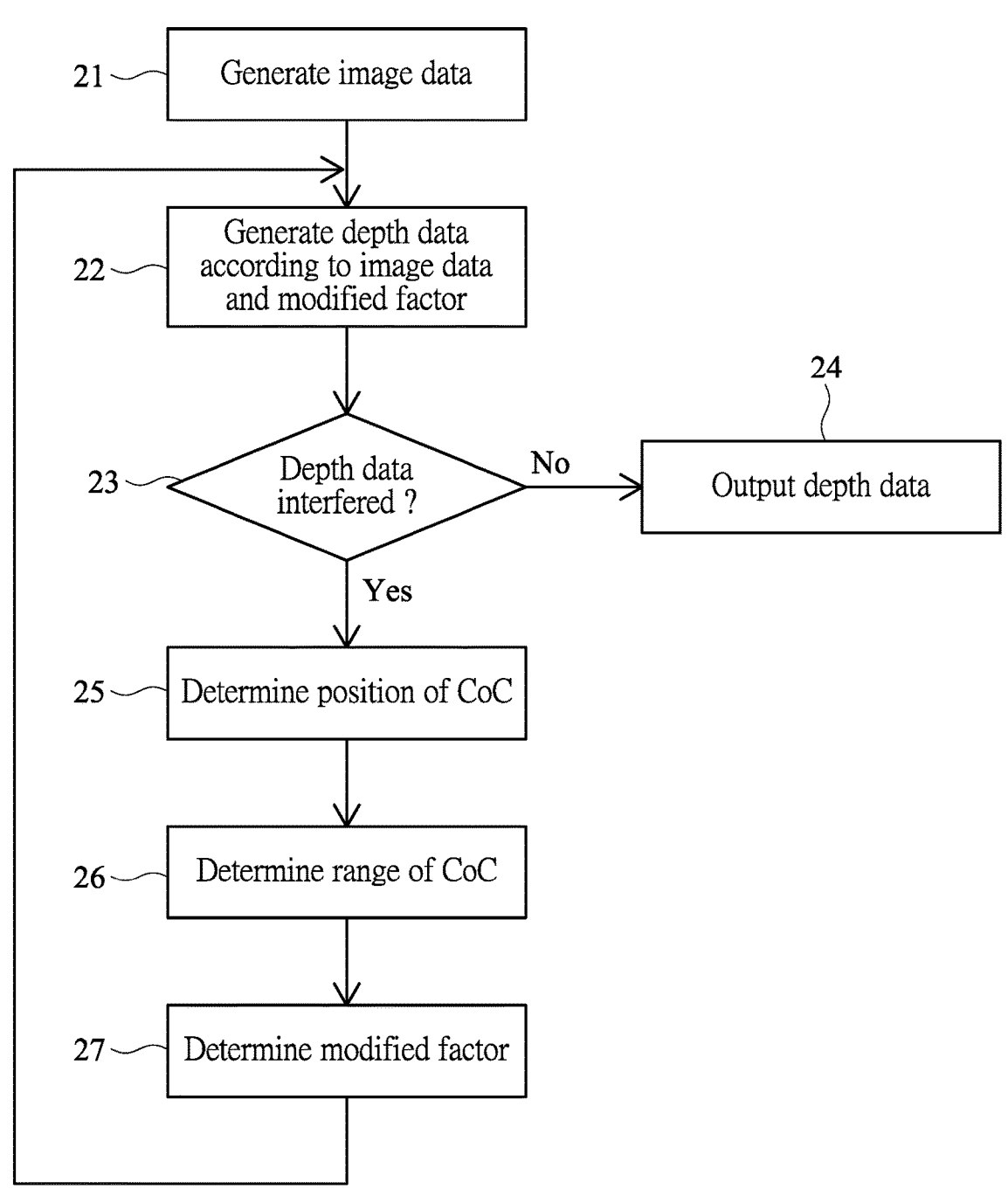
FIG. 5 shows a flow diagram illustrating a three-dimensional (3D) scanning method according to one embodiment of the present invention.

FIG. 5 shows a flow diagram illustrating a three-dimensional (3D) scanning method 200 according to one embodiment of the present invention. In step 21, the projector 11 projects an emitted light on the object 10, and the sensor 12 then generates image data according to a reflected light. In step 22, the depth processor 14 generates depth data according to the image data and at least one modified factor representing corresponding deviation amount between a real image data (e.g., accumulated charge) and an ideal image data (for each pixel of the image data). It is noted that the modified factor may be an arbitrary value for the first time at the beginning of the flow.

In step 23, the depth processor 14 determines whether the depth data as generated is interfered by a circle of confusion (CoC). If it is determined not being interfered in step 23, the depth data is outputted (step 24), for example, feeding to the backend device 15. If it is determined being interfered in step 23, the flow goes forward to step 25, in which a position of the circle of confusion (CoC) is determined. Next, in step 26, a range of the circle of confusion (CoC) is determined. Specifically, in one embodiment, the position and the range of the circle of confusion (CoC) may be determined by comparing (the brightness of) the image data with the depth data (e.g., depth map), inconsistency (e.g., inconsistent region) therebetween or abrupt change in depth value indicating interference.

In step 27, the modified factor is determined (and updated and stored) according to the position and the range of the circle of confusion (CoC). Specifically, in one embodiment, at least one pixel near the position (and within the range) of the circle of confusion (CoC) is taken as an ideal image data, and corresponding deviation amount between a real image data (e.g., accumulated charge) and the ideal image data is thus determined as the modified factor. Subsequently, the flow goes back to step 22, in which depth data is repetitively generated according to the image data and the updated modified factor until the generated depth data is determined no longer being interfered (step 23), that is, the extend of interference is less than a predetermined threshold.

Figure 6:
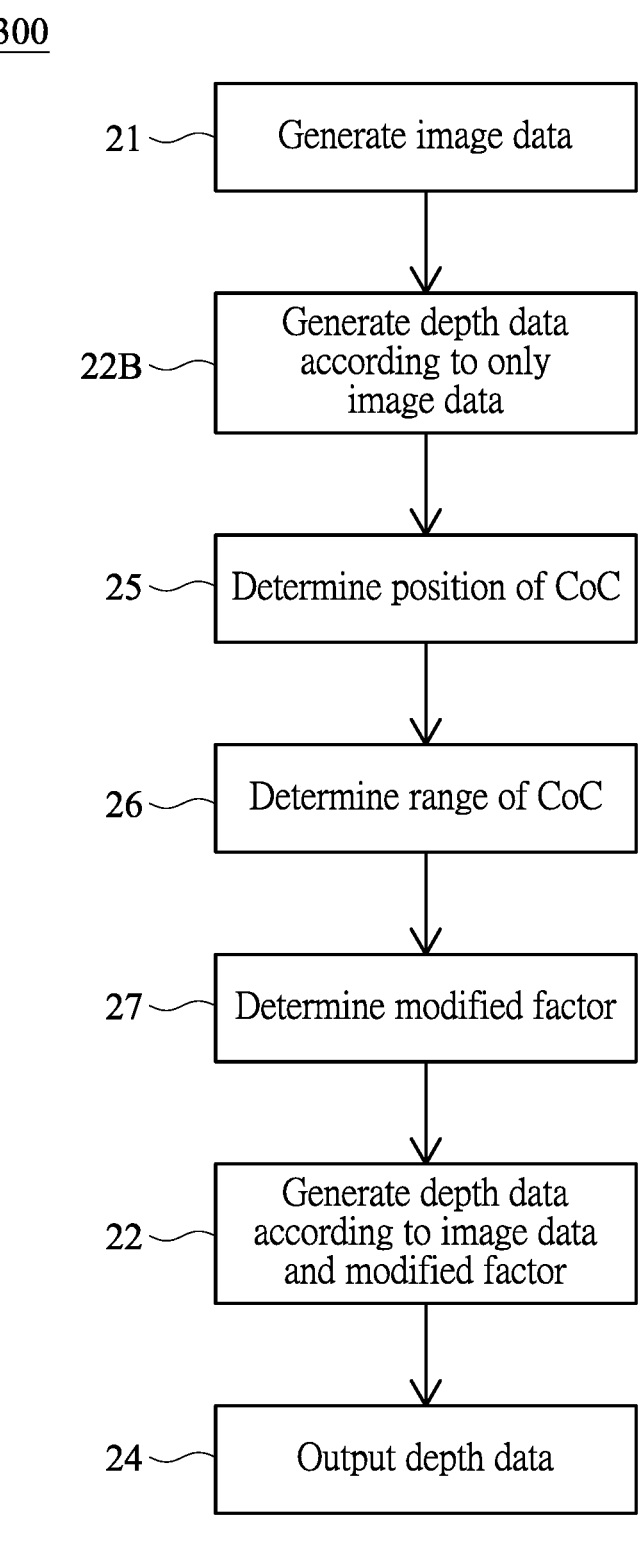
FIG. 6 shows a flow diagram illustrating a three-dimensional (3D) scanning method according to another embodiment of the present invention.

FIG. 6 shows a flow diagram illustrating a three-dimensional (3D) scanning method 300 according to another embodiment of the present invention. In step 21, the projector 11 projects an emitted light on the object 10, and the sensor 12 then generates image data according to a reflected light. In step 22B, the depth processor 14 generates depth data for the first time according to only the image data.

In step 25, a position of the circle of confusion (CoC) is determined. In step 26, a range of the circle of confusion (CoC) is determined. In step 27, a modified factor is determined (and stored) according to the position and the range of the circle of confusion (CoC). Next, in step 22, the depth processor 14 generates depth data for the second time according to both the image data and the determined modified factor. Finally, in step 24, the depth data is outputted, for example, feeding to the backend device 15.

Figure 7:
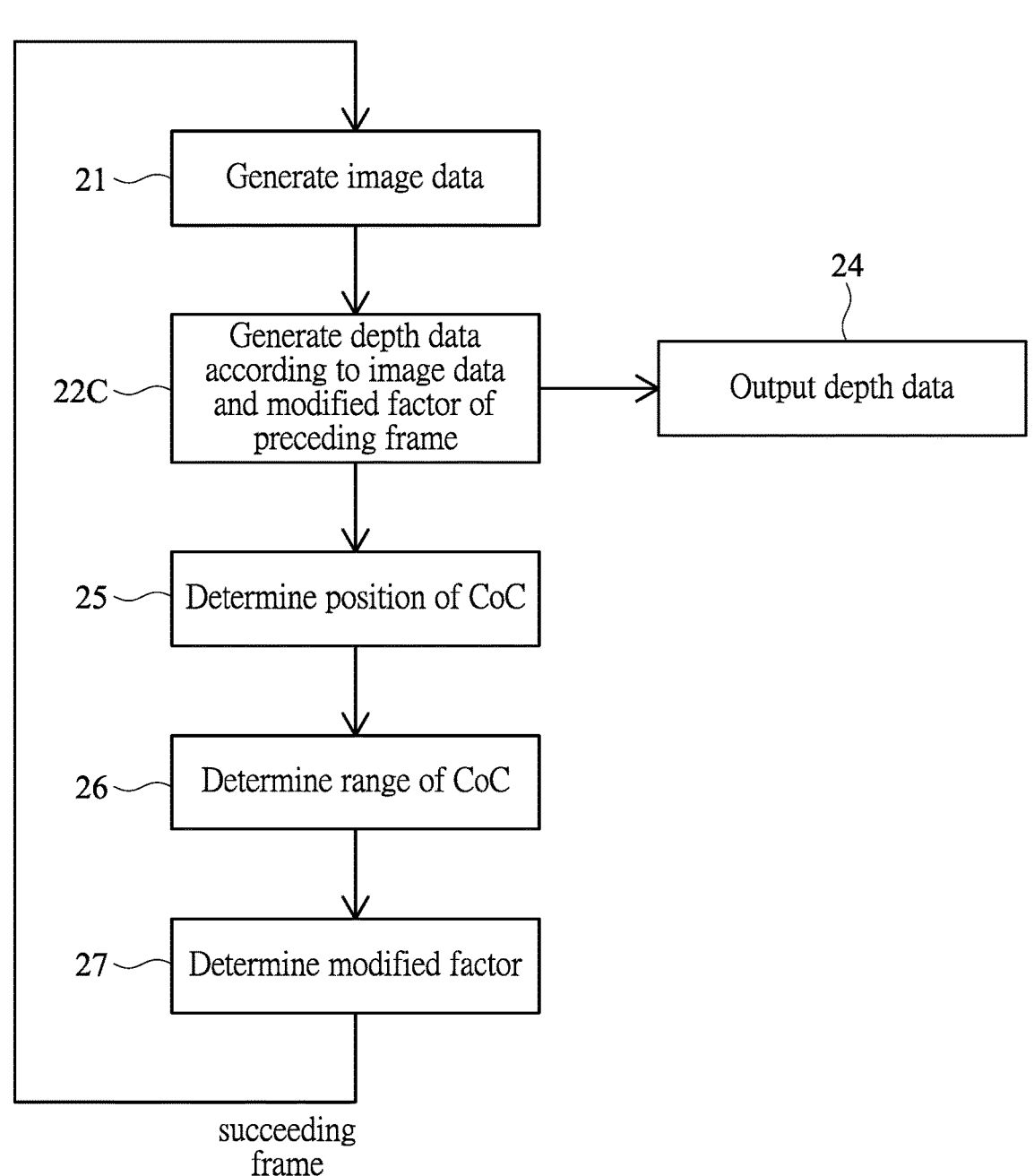
FIG. 7 shows a flow diagram illustrating a three-dimensional (3D) scanning method according to a further embodiment of the present invention.

FIG. 7 shows a flow diagram illustrating a three-dimensional (3D) scanning method 400 according to a further embodiment of the present invention. In step 21, the projector 11 projects an emitted light on the object 10, and the sensor 12 then generates image data according to a reflected light. In step 22C, the depth processor 14 generates depth data according to the image data and a modified factor of a preceding frame. Subsequently, in step 24, the depth data is outputted, for example, feeding to the backend device 15.

Next, in step 25, a position of the circle of confusion (CoC) is determined. In step 26, a range of the circle of confusion (CoC) is determined. In step 27, the modified factor is determined (and updated and stored) for a succeeding frame according to the position and the range of the circle of confusion (CoC), and the flow goes back to step 21 for the succeeding frame. It is appreciated that the flow of FIG. 7 may be either performed for every frame; performed for every few frames having specific or constant) or random amount; or performed at intervals each having specific (or constant) or random length of time.

Although specific embodiments have been illustrated and described, it will be appreciated by those skilled in the art that various modifications may be made without departing from the scope of the present invention, which is intended to be limited solely by the appended claims.

What is claimed is:

1. A three-dimensional (3D) scanning system, comprising:
   a projector that generates an emitted light projected on an object, a reflected light being reflected from the object;
   a sensor that generates image data according to the reflected light; and
   a depth processor that generates depth data according to the image data and at least one modified factor representing corresponding deviation amount between the image data and an ideal image data due to a circle of confusion caused by the reflected light passing a lens of the sensor and then irradiating a sense plane of the sensor out of focus;
   wherein the circle of confusion is determined by comparing the image data with the depth data.

2. The 3D scanning system of claim 1, wherein inconsistency between the image data and the depth data or abrupt change in depth value indicates interference with the circle of confusion.

3. The 3D scanning system of claim 1, wherein at least one pixel near a position of the circle of confusion is taken as the ideal image data.

4. The 3D scanning system of claim 1, wherein the projector comprises a light source including a point light source, a scatter light source or a plane light source.

5. The 3D scanning system of claim 4, wherein the light source comprises a light-emitting diode or a laser diode.

6. The 3D scanning system of claim 5, wherein the laser diode comprises an edge-emitting laser (EEL) or a vertical-cavity surface-emitting laser (VCSEL).

7. The 3D scanning system of claim 1, further comprising:
   a controller that controls timing of the projector and the sensor.

8. The 3D scanning system of claim 1, further comprising:
   a backend device that receives the depth data to realize a 3D application.

9. The 3D scanning system of claim 1, wherein the circle of confusion becomes larger when the object possesses higher reflectivity or is nearer the sensor.

10. The 3D scanning system of claim 1, wherein the image data are generated with a plurality of measure windows, during which accumulated charges are collected respectively.

11. A three-dimensional (3D) scanning method, comprising:
   projecting an emitted light and receiving a reflected light, according to which image data is generated;
   determining a position and a range of a circle of confusion caused by the reflected light irradiating a sense plane out of focus;
   determining at least one modified factor according to the position and the range of the circle of confusion, the at least one modified factor representing corresponding deviation amount between the image data and an ideal image data due to the circle of confusion; and
   generating depth data according to the image data and the at least one modified factor;
   wherein the circle of confusion is determined by comparing the image data with the depth data.

12. The 3D scanning method of claim 11, wherein inconsistency between the image data and the depth data or abrupt change in depth value indicates interference with the circle of confusion.

13. The 3D scanning method of claim 11, wherein at least one pixel near the position of the circle of confusion is taken as the ideal image data.

14. The 3D scanning method of claim 11, wherein the at least one modified factor as determined is updated and stored for later use of generating the depth data.

15. The 3D scanning method of claim 14, wherein the depth data is repetitively generated according to the image data and the at least one modified factor as updated until the generated depth data is determined no longer being interfered.

16. The 3D scanning method of claim 11, wherein the depth data is generated for a first time according to only the image data, prior to determining the position and the range of the circle of confusion.

17. The 3D scanning method of claim 16, wherein the depth data is generated for a second time according to both the image data and the at least one modified factor as determined, after determining the at least one modified factor.

18. The 3D scanning method of claim 11, wherein the depth data is generated according to the image data and the at least one modified factor of a preceding frame.

19. The 3D scanning method of claim 18, wherein the at least one modified factor as determined is updated and stored for a succeeding frame.

20. The 3D scanning method of claim 19, wherein the at least one modified factor is determined either for every frame; for every few frames having specific or random amount; or at intervals each having specific or random length of time.

* * * * *